Sept. 8, 1931.  R. SCHWENKE  1,822,673
STARTING APPARATUS FOR MOTOR VEHICLES WITH INTERNAL COMBUSTION ENGINES
Filed July 25, 1929
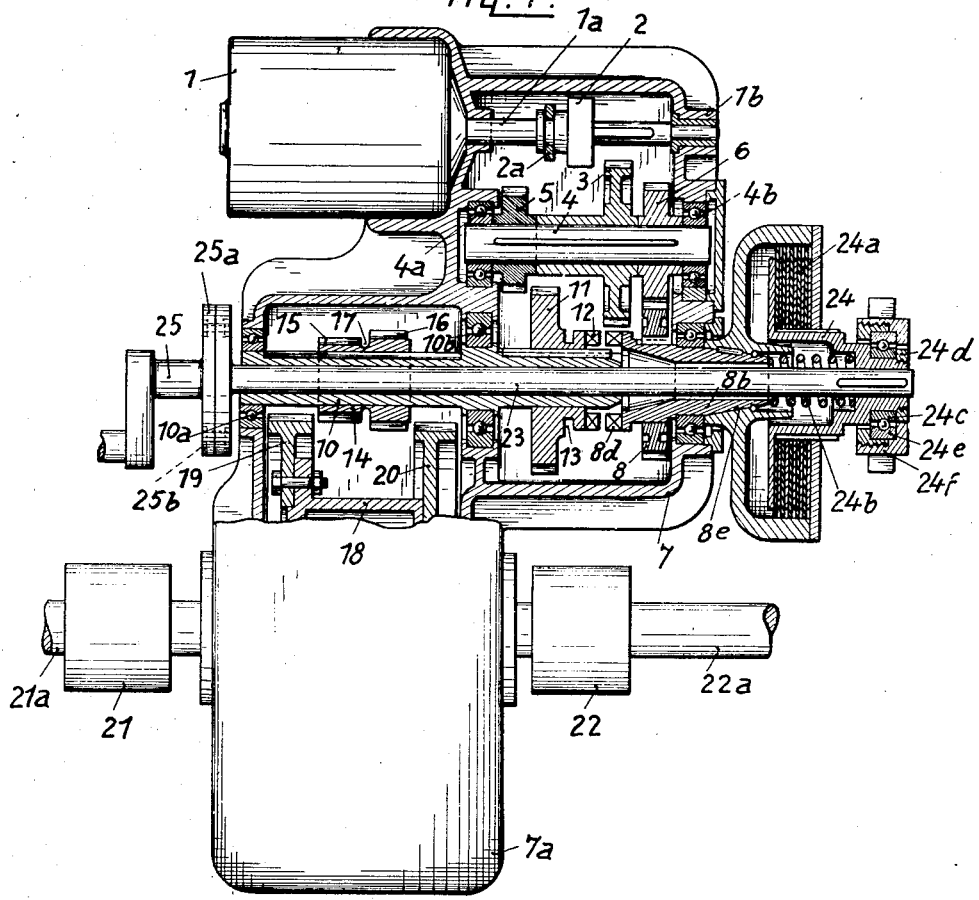
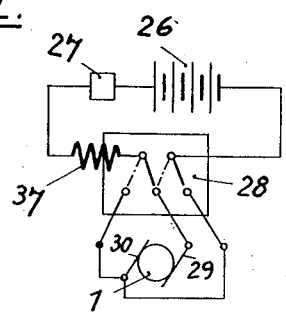
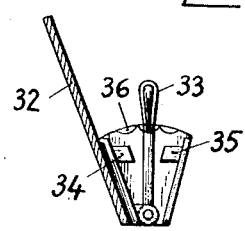
Inventor:
Robert Schwenke
by Mocho Blum
Atty.s Patented Sept. 8, 1931

1,822,673

UNITED STATES PATENT OFFICE

ROBERT SCHWENKE, OF BERLIN-CHARLOTTENBURG, GERMANY, ASSIGNOR TO FREIHERR IWAN von STIETENERON, OF WELSEDE, GERMANY

STARTING APPARATUS FOR MOTOR VEHICLES WITH INTERNAL COMBUSTION ENGINES

Application filed July 25, 1929, Serial No. 380,840, and in Germany February 8, 1928.

I am aware that already it has been proposed, to start at the same time both the whole vehicle mass and the internal combustion engine of a motor vehicle by means of a starting engine, for instance an electromotor, giving a little velocity to the vehicle and its engine. It is desired that the starting engine will be small and have not much weight; therefore it must run with high velocity and a speed reduction gearing must be provided between the starting engine and the internal combustion engine to reduce the high velocity of the starting engine into the slow velocity, with which the combustion engine is to be started. For the ratio of this gearing certain limits are given if complication of the said gearing should be voided. The limited gearing ratio has the effect that the starting engine must have a certain weight if the both functions, that is to say the starting of the combustion engine and the starting of the vehicle mass, should be fulfilled at the same time.

Furthermore it has been proposed, to separate the said both functions, that is to say that the starting motor starts either the vehicle mass with the combustion engine being at standstill or the combustion engine with the vehicle mass at rest, the clutch device being disconnected in both cases, or to start firstly the combustion engine and later the vehicle mass, or firstly the vehicle mass and later the combustion engine. Hitherto in such starting apparatus both the combustion engine and the vehicle mass have been started in using only the gearing of the starting engine the ratio of which is limited for the reasons given above.

For the purpose to reduce in a very extraordinarily efficient manner the weight and size of the starting engine I arrange the starting engine in such a manner that, in starting the vehicle mass separately from the combustion engine, the reduction gearing of the starting engine is compounded with the slow speed train of the change speed gearing appertaining to the combustion engine.

Another object of the invention is to arrange the clutch device in such a manner that it can be interposed at will either between the starting engine and the combustion engine or between the combustion engine and the change speed gearing.

Another object of the invention is to dispense with the reversing gear in using a reversible starting engine together with compounded starting engine gearing and slow velocity train.

Other objects of the invention will be hereinafter pointed out or will otherwise appear in connection with the following description of the embodiment of the invention illustrated in the accompanying drawings in which:

Figure 1 is a diagrammatical plan view of the arrangement of the whole driving apparatus with the electrical starting and internal combustion engines.

Figure 2 is a diagrammatical view of the arrangement of the electrical connections of the starting engine and Figure 3 is a vertical sectional view of the switch board showing the arrangement and construction of the switch device.

The reversible electrical starting engine 1 has for instance a power of not more than 0.75 H. P. (horsepower). The armature shaft $1a$ is journalled within the starting engine casing and at $1b$ within the gear box 7. The pinion 2 is splined onto the armature shaft $1a$ of the starting engine and is, by means of a fork $2a$, shiftably arranged thereon, or the pinion 2 is shiftable together with the armature.

A gearing shaft 4 is journalled by means of bearings $4a$ and $4b$ within the gear box 7 and has secured thereon the toothed wheels 3, 5 and 6, the pinion 2 to be meshed by shifting with the wheel 3. The wheel 6 meshes constantly with a wheel 8 loosely journalled by means of a bearing $8a$ within the gear box 7 and loosely arranged upon a shaft 23 to be described hereinafter. The wheel 8 has a hollow hub $8b$ provided at its end within the box with clutch dogs $8d$ and extending through the box 7. The extended hub end carries secured thereon a clutch member 9.

A hollow shaft 10 is journalled within the box 7 by means of bearings $10a$ and $10b$ in line with the hub $8b$ and has splined on it a sliding wheel 11 carrying dogs 12 corresponding to the dogs 8d. The wheel 11 has an annular groove 13 for gripping by a fork not shown and is to be shifted in such a manner that either the clutch members 8d, 12 are closed or the wheel 11 is meshed with the wheel 5 or a neutral intermediate position is attained.

The hollow shaft 10 has splined thereon another sliding double change speed member 14 comprising two pinions 15 and 16 and a ring groove 17 for receiving a shifting fork not shown.

The gear box 7 has an extension 7a wherein the differential gear (not shown) is positioned. The differential gear case 18 has secured thereon two toothed wheels 19 and 20 in such positions that either the pinion 15 may be meshed with the wheel 19 or the pinion 16 with the wheel 20 or the pinions 15 and 16 may be brought in the shown neutral position. The speed ratio of the pair 16, 20 is greater than that of the pair 15, 19.

The motion is transmitted from the differential gear in a well known manner by means of Cardan joints 21 and 22 to the driving shafts 21a and 22a of the driving wheels (not shown) of the vehicle.

It is to be borne in mind that all the pinions and wheels have cylindrical teeth.

The crank shaft 25 of the combustion engine (not shown) is arranged transversely to the vehicle and carries a flange 25a connected by screw bolts 25b with the flange 23a of a shaft 23 extending through and rotatably arranged within the hollow shaft 10 and the hollow hub 8a. The outer end of the shaft 23 has splined thereon a clutch member 24. Between the clutch members 9 and 24 laminated discs 24a are arranged in a well known manner. A coiled spring 24b is interposed between the hub 8a and the clutch member 24. The member 24 carries on its hub the inner ring 24c of a ball bearing, this ring being secured by a nut 24d. The outer ring 24e is secured within a shifting ring 24f.

The operation of the described apparatus is the following:

In starting the vehicle the clutch device 9, 24 is loosed. The pinion 2 is meshed with the wheel 3, the wheel 11 with the pinion 5 and the pinion 15 with the wheel 19. Then the starting engine 1 is electrically connected. According to the direction in which the starting engine runs, the vehicle is started either forward or backward, in both cases with the smallest possible speed ratio. For instance, the driver may repeatedly drive forward and backward for turning in a narrow street without starting the combustion engine and without letting in the clutch. Should, in another case, the traversing of a crossing street in a great city be forbidden for a little time, he may bring the combustion engine to a standstill, and, after the traversing has been permitted, he may at once start the vehicle by means of the starting engine without starting the combustion engine, no petrol being consumed in the meantime and no noise of his own combustion engine calling the driver's attention away from other noises.

After the starting engine has run a little time in the forward direction, the vehicle has a sufficient velocity to give to the vehicle an important inertia. Now the clutch device 9, 24 is maintained in its letting-in position and the wheel 11 is shifted to close the dogs 8d, 12. In this position the combustion engine is started by the inertia of the vehicle. The energy of the running starting engine may be added to the inertia of the vehicle. In this case it is preferred to make mesh the pinion 16 with the wheel 20. Then the inertia of the vehicle is transmitted through the wheel 20 and the pinion 16, the hollow shaft 10, the sliding member 11, the dogs 12, 8d, the wheel 8, the clutch device 24, 9 and the shaft 23 backward to the crankshaft 25 of the combustion engine.

In general, firstly the vehicle and then the combustion engine is started. But if in any case the driver prefers firstly to start the combustion engine, for instance if an upward slope is to be ascended or another impediment is to be overcome, the sliding members 15, 16 and 11 are brought in their neutral positions, the pinion 2 is meshed with the wheel 3 and the starting engine 1 is operated. After letting in the clutch device 9, 24 the combustion engine shaft 25 is rotated by means of the transmission 2, 3; 6, 8; 9, 24; 23. After the combustion engine has been started and runs with its full velocity, the vehicle may be started by operating the clutch device 9, 24 and making mesh the pinion 15 with the wheel 19. After the vehicle runs, a greater speed may be attained in a well known manner by operating the clutch device 9, 24 and by shifting the member 15, 16 to mesh the pinion 16 with the wheel 20, the dogs 8d and 12 being closed. Then the motion is transmitted from the crankshaft 25 through the clutch device 24, 9, the dogs 8d, 12 and either the pair 15, 19 or 16, 20. Should higher velocities be attained the member 11 is shifted to mesh with the pinion 5 and the motion is transmitted from the crankshaft 25 through the clutch device 24, 9, the pairs 8, 6 and 5, 11 and either pair 15, 19 or 16, 20. Therefore four forward speeds are attainable.

In the circuit of the starting engine the battery 26 is connected, as best shown in Figure 2, with its one pole with the metallic mass 27 of the vehicle frame, it being borne in mind that grounding is not possible upon the running vehicle. The other pole is connected with one terminal of a reversing switch 28 from which conductors pass to the two brushes 29, 30 of the starting engine 1. The other terminal of the switch is connected with the mass 27, a starting resistance 37 being interposed.

A switch lever 33 bridging either two front contacts 34 or two back contacts 35 or resting in a neutral intermediate position is provided on the switch board 32 in front of the driver. In its three positions the handle is secured against unintentional positioning by snap notches 36 in well known manner.

No special backward gears being provided the gearing is very simple and compact.

For the sliding wheel 11 a wheel rotatable but not slidable upon the shaft 10 together with a clutch member provided on both ends with dogs could be inserted. But the shown construction has the advantage that, when the wheel 11 should not be used, it does not rotate upon the hollow shaft 10.

What I claim is:

1. In combination, a hollow shaft 10, a second shaft 23 extending through said hollow shaft and adapted to be driven by an internal combustion engine, longitudinally shiftable gears 11 and 15 mounted on said hollow shaft 10 and forming part of a speed-change system, a free gear 8 freely mounted on said second shaft 23 so that said shaft 23 can turn relatively to free gear 8, a clutch device 24 and 9 adapted to connect free gear 8 and second shaft 23 at will, a starting motor having a shaft, a slidable gear 2 mounted on the motor shaft, a gear shaft 4 having a gear 3 adapted to mesh with the slidable gear 2 on the motor shaft, and a gear 6 mounted on said gear shaft and adapted to actuate the free gear 8.

2. In combination, a hollow shaft 10, a second shaft 23 extending through said hollow shaft and adapted to be driven by an internal combustion engine, longitudinally shiftable gears 11 and 15 mounted on said hollow shaft 10 and forming part of a speed-change system, a free gear 8 freely mounted on said second shaft 23 so that said shaft 23 can turn relatively to free gear 8, a clutch device 24 and 9 adapted to connect free gear 8 and second shaft 23 at will, a starting motor having a shaft, a slidable gear 2 mounted on the motor shaft, a gear shaft 4 having a gear 3 adapted to mesh with the slidable gear 2 on the motor shaft, and a gear 6 mounted on said gear shaft and adapted to actuate the free gear 8, the longitudinally shiftable gear 11 having means adapted to engage and drive the free gear 8.

In testimony whereof I have signed this specification.

ROBERT SCHWENKE.